March 28, 1950     S. S. BROWN     2,501,931
SLEEVE BEARING
Filed Feb. 25, 1948
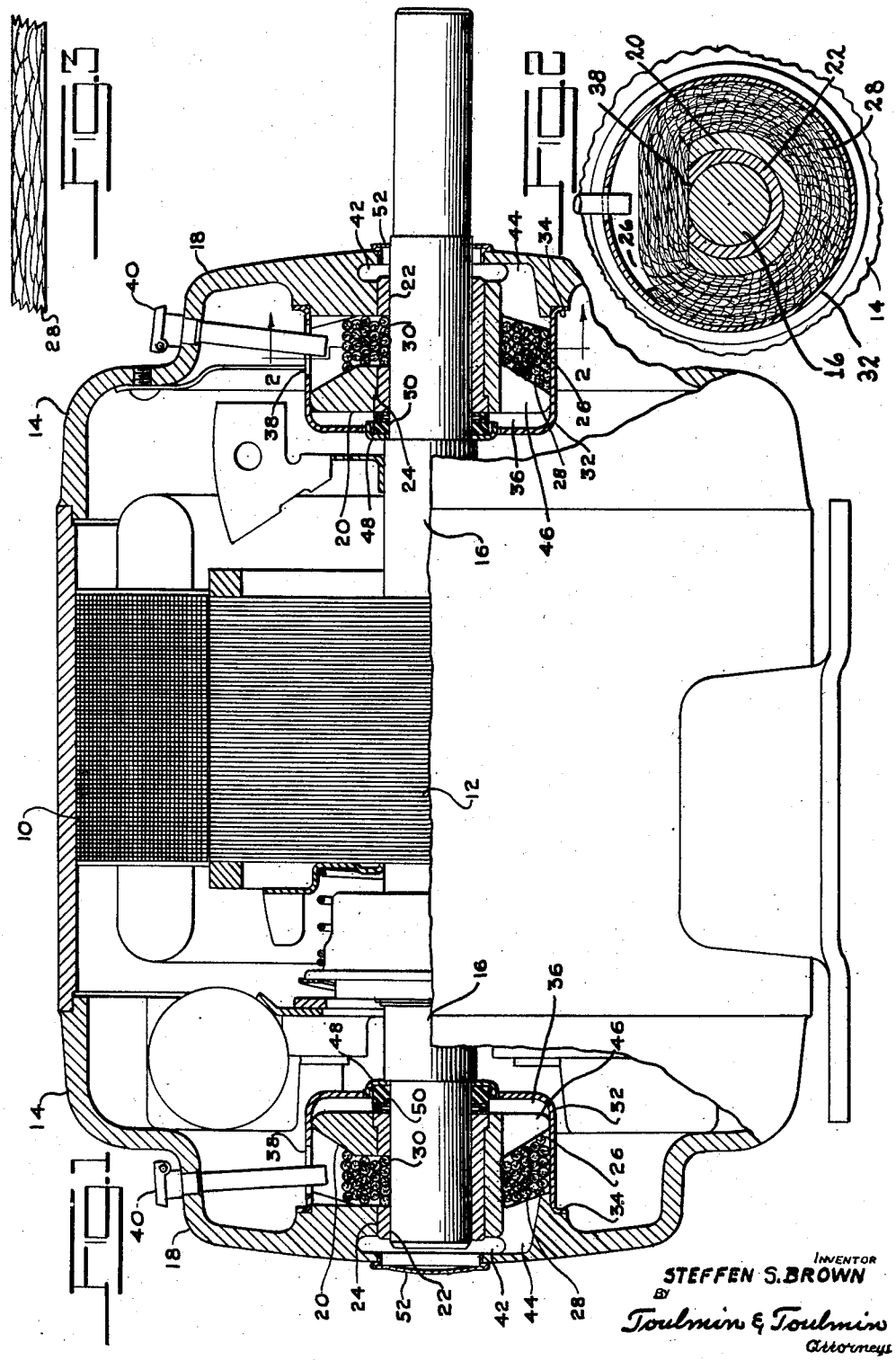
INVENTOR
STEFFEN S. BROWN
BY
Toulmin & Toulmin
Attorneys Patented Mar. 28, 1950

2,501,931

UNITED STATES PATENT OFFICE 2,501,931

SLEEVE BEARING

Steffen S. Brown, Dayton, Ohio, assignor to The Brown-Brockmeyer Co., Dayton, Ohio, a corporation of Ohio Application February 25, 1948, Serial No. 10,649

9 Claims. (Cl. 308—132)

This invention relates to bearing arrangements, and particularly to sleeve bearing arrangements of the type employed in connection with electric motors and the like.

This invention is shown and described in connection with an electric motor, but it will be understood that it is equally well adapted to any of many situations wherein there is a pair of machine elements which are relatively rotatable by means of a supporting sleeve bearing therebetween.

In the usual type electric motor which employs sleeve bearings the end bells or end frame members are cast with a boss part in the center thereof into which is pressed a sleeve bearing for journaling the rotary element of the motor.

These cast bosses are ordinarily hollow so that wicking or packing of some suitable material can be stuffed therein in order to convey oil to the shaft by capillary action and to maintain the shaft lubricated in the bearing at all times.

It will be evident that an arrangement of this type requires a rather complex coring arrangement at the time the end bell is cast, and further requires relatively thin supporting walls around the bearing in order to supply space for the wicking to be stuffed into the boss.

Furthermore, such an arrangement generally requires that the bearing supporting boss project outwardly from the end bell so that the wicking can be stuffed therein and this detracts somewhat from the appearance of the motor.

The primary object of the present invention is to provide a sleeve bearing arrangement especially adapted for electric motors and which overcomes the aforementioned objections.

Another object is to provide a sleeve bearing arrangement for an electric motor wherein the bearing has substantial support on the end frame member and the wall thickness of the supporting part is not limited as referred to above.

A still further object is the provision of a sleeve arrangement in which it is more easy to apply the wicking than in previous constructions.

A still further object of this invention is the provision of a sleeve bearing construction which is inexpensive, easy to machine, and which represents substantial savings in labor in the assembling of the motor, and especially in connection with the placing about the sleeve bearing of the wicking or packing.

These and other objects and advantages will become more apparent upon reference to the following description taken in connection with the accompanying drawings in which:

Figure 1 is a side view of an electric motor having a bearing constructed according to this invention and with a portion of the motor, including the bearings thereof, shown in section;

Figure 2 is a transverse section taken through one of the bearings of the motor and showing the arrangement therein of the wicking; and Figure 3 is a fragmentary view showing one type of wicking adapted for being employed with the bearing construction of this invention.

Referring to the drawings, the device shown therein is a substantially standard piece of rotary electrical equipment including a stationary frame or stator frame part 10 in which there is rotatable an armature 12.

The stationary or stator part 10 has mounted on each end thereof an end frame or end bell 14 and through these said end frames the supporting shaft 16 of the motor extends.

The various details in connection with the motor itself are not important to the particular invention and need not be described in detail other than to point out that included within the motor are contacts, insulated windings, and the like, which it is desired to protect from oil, and which protection, it will become evident, is supplied by the bearing construction of this invention.

Referring more particularly to the said end bells, it will be seen that each thereof is a bowl shaped element having a boss, rather large in diameter, projecting outwardly therefrom as at 18. At the center part of the walls of the bosses 18 there project inwardly from the end frames the bosses 20. The bosses 20 provide support for the sleeve bearings for the shaft indicated at 22 and are thus hollowed out as by the bores 24 extending therethrough.

It will be noted at this time that the wall thicknesses of the bosses 20 are quite substantial, thereby providing a rigid support for the bearings 22. This is a feature of the instant invention and is lacking in the usual type bearing support construction, which is hollow in order to receive wicking or packing.

According to this invention each of the bosses 20 has extending therearound an annular groove 26. These grooves 26 are somewhat inclined toward the open concave side of the frame members 14 due to the fact that the bosses 18 and 20 are co-extensive over a large part of their length and this inclining of the said grooves permits the easy introduction therein of the wicking or packing to be employed for lubricating the shaft 16 and bearings 22.

In each of the grooves 26 there is wound a plurality of turns of wicking or packing as indicated at 28. This wicking or packing is of any suitable substance having the required capillary attraction and may consist of woven, braided, twisted or gathered fibers of wool and the like, so arranged that the individual fibers thereof extend generally lengthwise of the strand of wicking as indicated in the enlarged view in Figure 3.

The wicking or packing may furthermore be preformed to as tight or as loose a bundle of fibers as it is desired and the winding thereof around the groove 26 can be controlled as to tension on the strings of wicking when it is installed therein. This permits a closely controlled packing arrangement at each of the bearings.

In order for the wicking to have access to the shaft the bearings 22 and the grooves 26 have aligned apertures or openings therein as at 30, and these openings are preferably at the top of the shaft. It will be understood that while only one opening is shown, there could be two if desired or more, and that they could be arranged either at the top or bottom of the bearings or at the sides thereof as desired.

It will be noted upon reference to Figures 1 and 3 that the strings of wicking substantially fill the groove 26 at the bottom thereof, thereby to pick up even small amounts of oil, whereas at the tops of the grooves 26 there is a substantial space which will permit the introduction into the grooves of oil or lubricant.

In order to retain lubricant about the bosses 20 each thereof has pressed thereover a thin cup like member 32 which is preferably of metal and which fits tightly around the machined outer surfaces of the bosses 20.

These thin cups preferably have feet thereon as at 34 which abut shoulders on the bosses whereby a space 36 is left between the inner ends of the bosses 20 and the bottom walls of the cups 32. The cups 32 provide closures around the bosses and serve as oil reservoirs for retaining lubricant around the wicking 28.

Each of the closure members or reservoirs 32 is apertured at the top as at 38 and any suitable lubricant introducing device may extend therein and upwardly through the side walls of the bosses 18 and mount a fitting such as the oil cups 40 illustrated in the drawings.

It will be apparent at this point that the appearance of the end frames is much improved due to the massive like bosses 18, and that the entire bearing supporting and lubricating arrangement, except for the cups 40, is disposed internally of the end frames 14.

Due to the fact that some slippage of some lubricant will take place along the shaft 16 within the bearings 22, there is preferably provided in each of the end frames 14 a groove or recess 42 which communicates with the lowermost portion of the reservoir formed by the cup members 32 by means of the channel 44. Similarly, the spaces 36 communicate with the lowermost part of the reservoir and with the wicking therein through the channel or opening 46. It will be apparent that all slippage of oil at either end of either of the bearings is conveyed by gravity and directed back to the wicking 28. This is of importance in preventing leakage of oil to the outside of the motor and also to the inside thereof where it would have a deteriorating effect on the contacts and insulated windings therein.

In connection with possible leakage of oil to the inside of the motor, it will be noted that the shaft 16 is shouldered immediately prior to its entrance into each of the cup members 32 and that a small cup member 48 rests against each of the said shoulders and has its upturned edge extending inwardly into the aperture in the adjacent cup member 32, so that there is little, if any, possibility that oil can leak therethrough.

Between each of the small cup members 48 and the adjacent end of the bearing 22 at that end there may be placed the thrust washers 50 which serve to prevent or limit the end play of the rotary portion of the electric motor and may be adjusted at the time of assembling in order to provide for exact alignment of the iron parts of the stator and rotor.

The end bells 14 at opposite ends of the motor may be identical or each may be formed to perform certain functions such as the supporting of switches and the like. The shaft 16 may extend completely through both of the said end frames to provide for a double ended motor or may be extended through one thereof as shown in the right end of the drawing.

At any case the dust caps 52 may be provided which fit relatively closely over the shaft and which are pressed into the apertures in the centers of the end bells 14 from the outside thereof. These dust caps prevent dust from entering the bearing wells in the end frames and also provide for a finished appearance of that part of the motor.

Among the advantages to be found in connection with the bearing construction of this invention may be listed the following:

1. The placing of the wicking about the bearings is much more easily accomplished than heretofore when it was necessary to stuff loose wicking through a small hole in the bearing supporting boss.

2. The quantity and arrangement of the wicking about the bearing can more readily be controlled as well as the tightness thereof and the assembled wicking can be inspected if desirable.

3. The wicking, being in the form of string or yarn with the individual fibers generally axially aligned therein, has a maximum of capillary action and provides for adequate lubrication of the shaft and bearing over a long period of time and even when the quantity of oil in the reservoir falls to a minimum.

4. A large space is available for receiving oil and wicking and is not necessarily limited to the size of the bearing boss which it is practical to form in the end frame. The thin outer shell 32 permits the use of a large groove for receiving the wicking and permits a maximum of oil to be introduced around the wicking.

5. The wall thickness of the bearing supporting boss can be made very thick and thus provide for a rigid support for the bearings. This minimizes the chance that the castings will be improperly formed and therefore rejected, that the bearing supports will break through during machining, and that the said supports will crack in use.

6. The lubricant-introducing means mounted by the oil cups 40 are positioned adjacent the top of the motor and the tubes leading therefrom into the oil reservoir are entirely projected within the bosses 18 on the end frames. This places the oil cups in position to be easily reached at any time.

It will be understood that this invention is susceptible to modification in order to adapt it to different usages and conditions and, accordingly, it is desired to comprehend such modifications within this invention as may fall within the scope of the appended claims.

I claim:

1. In combination; a stationary element having a larger hollow boss extending outwardly from one side and a smaller hollow boss extending inwardly toward the other side from the bottom wall of said larger boss so the said bosses are at least partly co-extensive, a rotary element on the other side of said stationary element having a shaft extending into said smaller boss, a bearing pressed into said smaller boss and supporting said shaft, an annular groove around said smaller boss between the ends of said bearing, said smaller boss and bearing having an aperture at the top thereof opening into said groove, string wicking wrapped around said groove so as to contact said shaft through said aperture, a cup like shell pressed over said smaller boss and forming an oil reservoir therearound, and means for introducing lubricant into said reservoir from the said one side of said stationary element comprising a tube extending through the side wall of said larger boss and said shell into said groove.

2. In combination; a stationary element having a hollow boss extending from one side, a bearing pressed into said boss for receiving a shaft, an annular groove around said boss between the ends of said bearing, said boss and bearing having an aperture at the top thereof opening into said groove, string wicking wrapped around said groove, a cup like shell pressed over said boss and forming an oil reservoir therearound and apertured in its bottom wall to pass said shaft, a shoulder on said shaft adjacent the bottom wall of said shell and on the opposite side thereof from said boss, an annular member fitting over said shaft and abutting said boss, and an axially extending peripheral flange on said member telescoping with the aperture in the bottom wall of said shell.

3. In combination; a stationary element having a hollow boss extending from one side, a bearing pressed into said boss for receiving a shaft, an annular groove around said boss between the ends of said bearing, said boss and bearing having an aperture at the top thereof opening into said groove, string wicking wrapped around said groove, a cup like shell pressed over said boss and forming with said groove an oil reservoir extending around the boss, said shell being apertured in its bottom wall to pass said shaft, means to introduce lubricant into said reservoir from the side of said stationary element opposite said boss, a shoulder on said shaft adjacent the bottom wall of said shell, and an annular member fitting about said shaft and abutting said shoulder and having a marginal flange extending into the aperture in the bottom wall of said shell.

4. In combination; a stationary member having a hollow boss extending from one side, a rotary member on the said one side of said stationary member and having a shaft extending into said boss, a sleeve bearing pressed into said boss and journaling said shaft, an annular groove around said boss between the ends of said bearing, an aperture opening from said groove through the top of said boss and bearing to the surface of said shaft, a thin cup like shell pressed over said boss to form an oil reservoir therearound and apertured to pass said shaft, and means extending through said stationary member and into said reservoir for supplying lubricant thereto.

5. In combination; a concave stationary member having a hollow boss projecting centrally from the concave side thereof, a rotary member on the concave side of said stationary member having a shaft extending through said boss, a bearing in said boss supporting said shaft, an annular groove around said boss and string packing wound therearound, said groove being inclined toward the outer end of said boss to facilitate the winding therein of said packing, and an opening in the top of said boss and bearing through which said packing engages the surface of said shaft.

6. In combination; a concave stationary member having a hollow boss projecting centrally from the concave side thereof, a rotary member on the concave side of said stationary member having a shaft extending through said boss, a bearing in said boss supporting said shaft, an annular groove around said boss and string packing wound therearound, said groove being inclined toward the outer end of said boss to facilitate the winding therein of said packing, an opening in the top of said boss and bearing through which said packing engages the surface of said shaft, and a thin cup like member pressed over said boss to form an oil reservoir therearound and apertured to pass said shaft.

7. In combination; a concave stationary member having a hollow boss projecting centrally from the concave side thereof, a rotary member on the concave side of said stationary member having a shaft extending through said boss, a bearing in said boss supporting said shaft, an annular groove around said boss and string packing wound therearound, said groove being inclined toward the outer end of said boss to facilitate the winding therein of said packing, an opening in the top of said boss and bearing through which said packing engages the surface of said shaft, a thin cup like member pressed over said boss to form an oil reservoir therearound and apertured to pass said shaft, and a tube extending from said reservoir through said stationary member to the convex side thereof for supplying lubricant to the said reservoir.

8. In combination; a stationary member having a boss projecting from one side thereof, a sleeve bearing pressed in said boss, a groove around said boss for receiving string packing, an aperture in said groove and bearing through which said packing can contact a shaft in said bearing, a relatively thin closure member pressed over said boss and forming an oil reservoir therearound, said closure member having a greater axial length than said boss to provide a space therebetween at the outer end of said boss, an internal groove in said boss at the end of said bearing opposite said space, and channel means connecting said space and internal groove with said reservoir to drain oil which leaks out the ends of said bearing back to said reservoir.

9. In an electric motor, a rotary part with a shaft and a stationary end member through which said shaft extends, a boss projecting inwardly from said member and a bearing in said boss journaling said shaft, an annular groove around said boss open in at least one place to the surface of the shaft and string wicking in the groove, a cup shaped closure member pressed over said boss and forming with said groove an oil reservoir extending around the boss, said member having its bottom wall apertured to pass said shaft, a space between the bottom wall of the member and the end of the boss, an internal groove in the boss at the end of the bearing at the opposite end of the boss, a channel connecting said space and internal groove with said reservoir, and means extending through said end member from the outside to introduce lubricant into said reservoir.

STEFFEN S. BROWN.

REFERENCES CITED

The following references are of record in the file of this patent:

UNITED STATES PATENTS

| Number | Name | Date |
|---|---|---|
| 1,733,931 | Arnold | Oct. 29, 1929 |
| 2,014,584 | Peineke | Sept. 17, 1935 |
| 2,226,622 | Lignian | Dec. 31, 1940 |

FOREIGN PATENTS

| Number | Country | Date |
|---|---|---|
| 586,295 | Germany | Sept. 18, 1931 |
| 293,022 | Italy | Feb. 8, 1932 |